Feb. 19, 1957  A. H. DICKINSON  2,782,306
ELECTRONIC TRIGGER CIRCUIT
Filed Aug. 9, 1951  2 Sheets-Sheet 1

INVENTOR
ARTHUR H. DICKINSON
BY Dwight D. Mooney
ATTORNEY

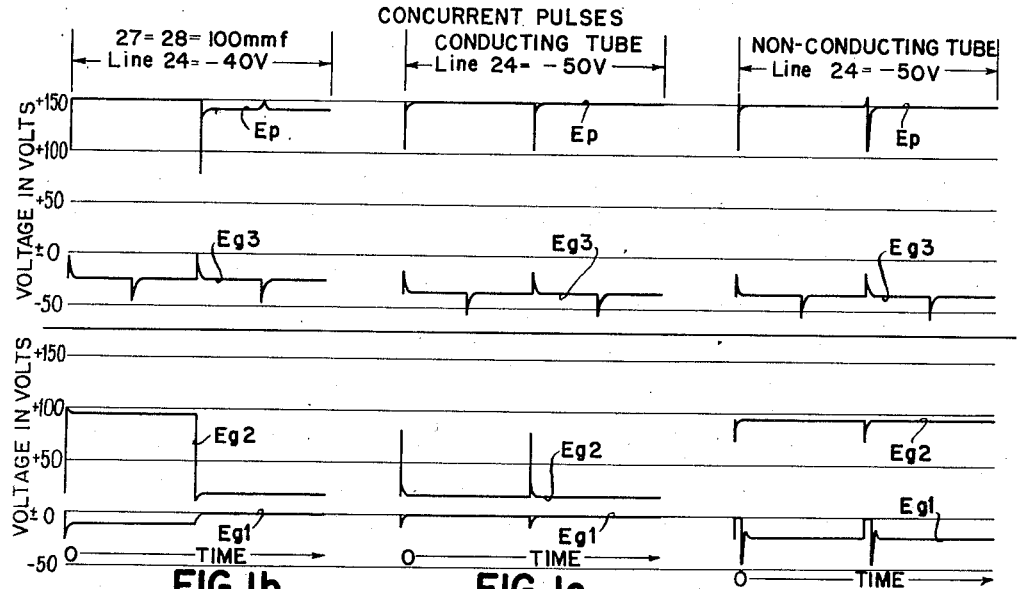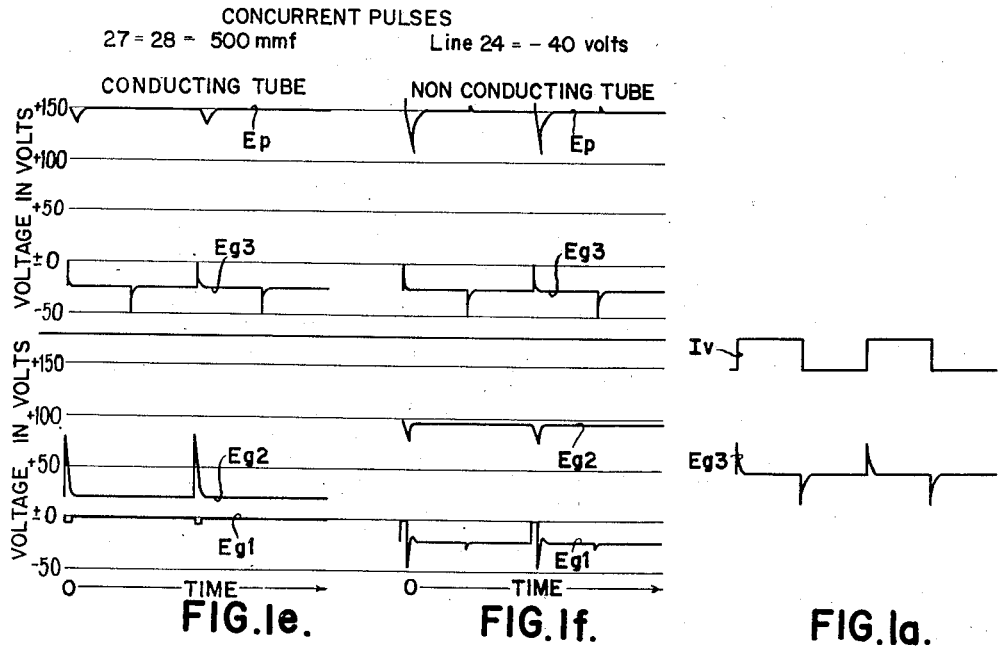

United States Patent Office 2,782,306
Patented Feb. 19, 1957

2,782,306

ELECTRONIC TRIGGER CIRCUIT

Arthur H. Dickinson, Greenwich, Conn., assignor to International Business Machines Corporation, New York, N. Y., a corporation of New York Application August 9, 1951, Serial No. 241,082

3 Claims. (Cl. 250—27)

This invention relates to switching circuits and more particularly to such circuits employing two multigrid electron tubes and having two electrical conditions alternately assumed in response to pulses applied thereto.

In electronic circuitry trigger circuits are frequently used to condition gating circuits to ensure performance of certain preselected functions. For example, a gate circuit may be conditioned to be responsive when a trigger circuit is in only one preselected stable condition. In such circuitry it is also frequently necessary to render certain circuits non-responsive to predetermined pulses applied thereto concurrently. The use of circuitry already employed to perform such a function provides for both simplification of the circuitry and reduction of the cost of fabrication.

In a conventional trigger circuit an input pulse is applied concurrently to an electrode of each trigger tube. During the switching of such trigger circuits feedback is conveyed to these inputs and the input pulse applied to each of the electrodes is effective to cause the introduction of transients which hamper switching of the trigger circuit even though the conductive condition of that trigger tube is such that the pulse effects no change in its conduction.

Accordingly, a principal object of this invention is to provide a trigger circuit wherein the above disadvantages are either completely eliminated or substantially reduced.

Another object is to provide a trigger circuit wherein dual inputs are applied thereto through a common conductive connection to the electrodes of the trigger tubes to eliminate feedback between those electrodes.

Another object is to provide a self-gating trigger circuit wherein a common electron stream produces equilibrium and triggering effects.

Still another object is to provide a trigger circuit having dual inputs only one of which as determined by the stable condition of the trigger circuit is responsive to an input pulse.

Another object is to provide a trigger circuit having two tubes and switchable in response to a certain pulse applied thereto and non-responsive to the concurrent application of such a pulse to each tube of the trigger circuit.

A further object is to provide a switching circuit responsive to a certain preselected pulse only within a predetermined range of circuit components.

Another object is to provide a switching circuit responsive to the concurrent application of pulses thereto over a predetermined range of bias voltage.

A still further object is to provide a trigger circuit having two stable conditions wherein the output of the conductive tube of the trigger circuit is applied to one of its grids to assist in switching the trigger circuit from one stable condition to the other.

Other objects of the invention will be pointed out in the following description and claims and illustrated in the accompanying drawings, which disclose, by way of example, the principle of the invention and the best mode, which has been contemplated, of applying that principle. Other embodiments of the invention employing the same or equivalent principle may be used and structural changes made as desired by those skilled in the art without departing from the present invention and within the spirit of the appended claims.

In the drawings:

Figs. 1a, 1b, 1c, 1d, 1e and 1f show wave forms which facilitate the understanding of the operation of the invention.

Briefly, the invention includes a novel trigger circuit of of the type having two grid controlled tubes and two stable conditions alternately assumed. In one stable condition one tube is conductive between its cathode and second grid and the other is non-conductive. In the other stable condition, the conductive condition of the tubes is reversed. Out-of-phase or concurrent positive pulses are applied to the third grids of the tubes to effect a switching of the trigger circuit from one stable condition to the other. To initiate switching of the trigger circuit, the conductive tube (conductive between the cathode and second grid) is rendered conductive between its cathode and plate. This decreased voltage at the plate of the tube is applied to the first grid of the tube to render it less conductive and in one embodiment is utilized to apply a positive voltage to the second grid of the other tube. In another embodiment the increased voltage at the second grid of the conductive tube, resulting from the negative voltage applied to its first grid, is applied to the first grid of the non-conductive tube to initiate conduction therein. Simple capacitance or bias voltage adjustment is provided to render the trigger circuit non-responsive to concurrently applied pulses over a preselected range of capacitance or bias voltage.

The third grids of the trigger tubes may be conductively connected together to apply concurrent pulses thereto. Also, there is no cross-coupling from these grids to other electrodes. These grids are therefore at the same voltage and feedback thereto is completely eliminated.

The arrangement of the trigger circuits will be described with reference to the applied voltage and the values of resistances and capacitances employed. These values are given solely for the purpose of clarifying the explanation and it is understood that they may be varied considerably without departing from the principles of the invention.

Figure 1:
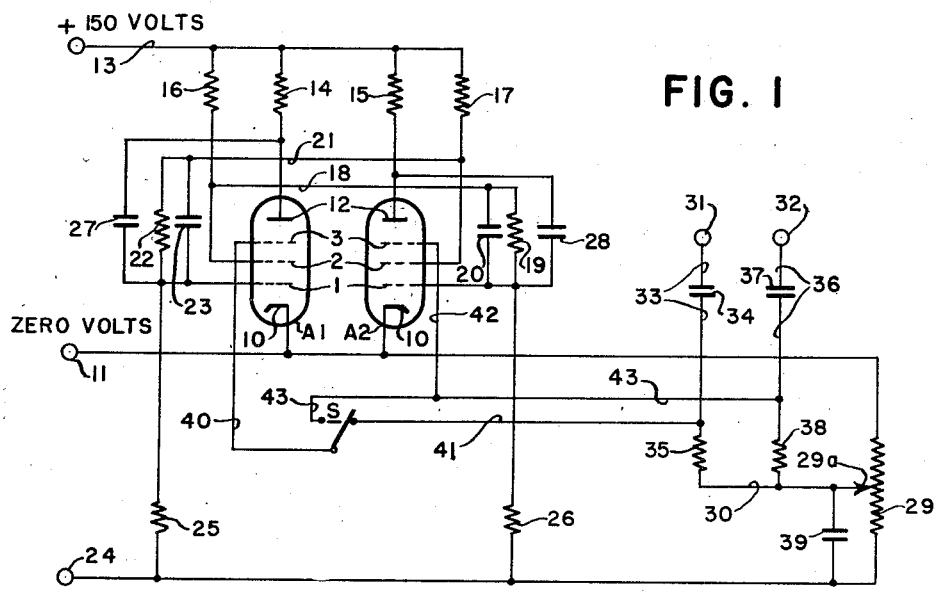
Fig. 1 is a circuit diagram of one embodiment of the invention.

Referring more particularly to Fig. 1, the trigger circuit includes two tubes A1 and A2 of the pentode type. These tubes may be of the type having a single tube in an envelope, such as the 6SJ7 type tube, or may be of the type having two tubes in a single envelope.

The cathodes 10 of the tubes A1 and A2 are connected to a zero volt line 11 and plates 12 of the tubes A1 and A2 are connected to a +150 volt line 13 through resistors 14 and 15 respectively, each of 100,000 ohms.

Each tube A1 and A2 contains a control, screen and suppressor grid referred to herein as first, second and third grids respectively.

The second grids of the tubes A1 and A2 are connected to the line 13 through resistors 16 and 17 respectively, each of 100,000 ohms. The second grid of the tube A1 is connected through a lead 18 and parallel connected resistor 19 and capacitor 20 to the first grid of the tube A2. The resistor 19 has a value of 200,000 ohms and the capacitor 20 has a value of 0.0001 microfarads. Likewise, the second grid of the tube A2 is connected to the first grid of the tube A1 through a lead 21 and parallel connected resistor 22 and capacitor 23 of 200,000 ohms and 0.0001 microfarad respectively. The first grids of the tubes A1 and A2 are connected to a bias voltage line 24 through bias resistors 25 and 26, each of 200,000 ohms. The plate of the tube A1 is connected to the first grid of that tube through a capacitor 27 of 0.00001 microfarad and the plate of the tube A2 is connected to the first grid of that tube through a capacitor 28 of 0.00001 microfarad.

A potentiometer 29 is connected between the zero volt line 11 and the bias voltage line 24. The potentiometer arm 29a supplies the bias voltage to the third grids of the tubes A1 and A2.

Input terminals 31 and 32 are connected to sources of positive pulses which may be out-of-phase with each other or concurrently applied. Pulses from the terminal 31 are applied through a lead 33 and a capacitor 34 of 0.00005 microfarad to a resistor 35 of 200,000 ohms connected to the potentiometer arm 29a and pulses from the terminal 32 are applied through a lead 36 and a capacitor 37 of 0.00005 microfarad to a resistor 38 of 2000,000 ohms connected to the potentiometer arm 29a. A capacitor 39 of 0.01 microfarad is connected between the lines 24 and 30 to maintain the line 30 at substantially constant voltage irrespective of the voltage pulses applied to the terminals 31 and 32.

The third grid of the tube A1 is connected through a lead 40 to the blade of a switch S, and when the switch blade is in the position shown it is connected through a lead 41 to the lead 33 connected to the terminal 31. The third grid of the tube A2 is connected through a lead 42 and a lead 43 to the lead 36 connected to the terminal 32. It should be noted that the other end of the lead 43 is connected to the other terminal of the switch so that when the switch blade is placed in contact with that terminal the third grid of the tube A1 is disconnected from thet terminal 31 and the third grid of both tubes A1 and A2 is connected to the terminal 32.

The trigger circuit has two stable conditions. In one such condition the tube A2 is non-conductive and the tube A1 is conductive between its cathode and its second grid, this stable condition is referred to herein as the "off" condition. In the other stable condition the tube A2 is conductive from its cathode to its second grid and the tube A1 is non-conductive, this stable condition is referred to herein as the "on" condition.

For the purposes of description, the trigger circuit will be assumed to be in the "off" condition at starting. Irrespective of the stable condition of the trigger circuit, the third grids of the tubes A1 and A2 are normally biased below the voltage necessary to maintain zero current flow at the plates of those tubes. This bias is obtained through the potentiometer arm 29a, the magnitude of the voltage being determined by the position of potentiometer arm 29a on the resistance 29.

With the blade of the switch S in the position shown, positive pulses from the terminal 31 are applied to the third grid of the tube A1 and pulses from the terminal 32 are applied to the third grid of the tube A2. Positive pulses applied to the third grid of the tube A2 are ineffective to render that tube conductive but a positive pulse of the same magnitude applied to the third grid of the tube A1 will render it plate current conductive since it was already conductive from its second grid to its cathode.

When the tube A1 is thus rendered plate current conductive, the resulting negative pulse at the plate is transferred through the capacitor 27 to the control grid of that tube. Accordingly, the bias voltage on the first grid of the tube A1 is made more negative and the current flow from the cathode to the second grid is decreased. The decreased voltage drop across the resistor 16 gives rise to a positive pulse which is transferred over the lead 18 and the parallel connected resistor 19 and capacitor 20 to the first grid of the tube A2 to increase the voltage on that grid. The voltage on this first grid is increased sufficiently to initiate current flow from the cathode to the second grid of the tube A2. The resulting current flow through the resistor 17 causes a negative pulse to be transferred over the lead 21 and parallel connected resistor 22 and capacitor 23 to the first grid of the tube A1 causing a further increase in the negative bias voltage on that grid.

The above described action is continued and the cumulative effect causes the trigger circuit to switch from the "off" to the "on" condition; hence, the tube A1 is rendered nonconductive and the tube A2 is rendered conductive between its cathode and second grid.

Since the tube A2 is conductive between its cathode and second grid and the tube A1 is non-conductive, positive pulses applied to the terminal 31 have no effect on the stable condition of the trigger circuit because they are ineffective to initiate electron flow from the cathode of the tube A1. However, the first positive pulse applied to the terminal 32 sufficiently increases the voltage on the third grid of the tube A2 to initiate conduction between its plate and cathode.

The voltage at the plate of the tube A2 decreases accordingly and a negative pulse is transferred through the capacitor 28 to the first grid of the tube A2. As a result, current between the cathode and the second grid is decreased with a corresponding decrease in the voltage drop across the resistor 17. The increased voltage at this second grid is transferred through the lead 21 and the parallel connected resistor 22 and capacitor 23 to the first grid of the tube A1. The voltage at the first grid of the tube A1 is increased correspondingly and the tube is rendered conductive between its cathode and second grid. This conduction produces a voltage drop across the resistor 16 and, therefore, causes the voltage at the second grid to be decreased.

The negative pulse is transferred through the lead 18 and parallel connected resistor 19 and capacitor 20 to the first grid of the tube A2 to decrease further the electron flow from its cathode. As a result, the voltage drop across the resistor 17 is decreased and the resulting positive pulse at the third grid is transferred through the lead 21 and the parallel connected resistor 22 and capacitor 23 to the first grid of the tube A1 to further increase the voltage on that grid and the current flow between the second grid and the cathode. This action is continued until the cumulative effect causes the trigger circuit to switch from the "on" to the "off" condition. So long as out-of-phase pulses are applied to the third grids of the tubes A1 and A2, the trigger circuit is switched alternately from one stable condition to the other.

If switch S is thrown to its alternate position so that pulses are applied in phase or concurrently to the third grids of the tubes A1 and A2, the stable condition of the trigger is uneffected under certain circuit conditions described hereinafter. This is true irrespective of whether or not the trigger is "on" or "off" when the pulses are applied.

If it is desired to apply concurrent pulses to the trigger circuit, the blade of the switch S is placed in its other position to contact the left terminal. The terminal 31 is then disconnected from the trigger circuit and the terminal 32 is connected to the third grid of each tube, thereby insuring simultaneous application of pulses to each third grid from the terminal 32.

While the values of the voltages, resistances and capacitances used may be widely varied and the trigger operation maintained as described above, these values may be changed, without changing the circuit arrangement, so as to effect operation as a conventional trigger. The increased utility of this novel trigger arrangement is readily appreciated when it is understood that such conventional operation may be obtained by decreasing the voltage difference between the lines 24 and 30 or by reducing the values of the capacitors 27 and 28. The change in the voltage difference and values of the capacitors may be accomplished by the use of any conventional means, such as switches, adjustable capacitors and the like. Hence, by the use of simple means the trigger circuit can be made to assume either of two different modes of operation. These modes of operation are more fully explained in connection with Table I below, the values of which were determined by experiment.

TABLE I

*Trigger circuit of Fig. 1*

| Values of capacities 27 and 28 in mmf. | Switches in response to concurrently applied pulses (Switch blade of Switch S on left terminal) | | Switches in response to out-of-phase pulses (Switch blade of Switch S on right terminal) | | Input Voltage Pulse Amplitude |
|---|---|---|---|---|---|
| | Voltage on line 24 | | Voltage on line 24 | | |
| | Max. | Min. | Max. | Min. | |
| 100 | −34 | −44 | −34 | −55 | 25 |
| 200 | −34.5 | −41.5 | −34.5 | −60 | 25 |
| 300 | | | −36.5 | −60 | 25 |
| 500 | | | −41 | −60 | 25 |
| 1,000 | | | −35 | −57 | 25 |
| 2,000 | | | −35 | −62 | 25 |

It is immediately seen that switching of the trigger circuit may be accomplished by either concurrently applied or out-of-phase pulses throughout the bias voltage range of −34 to −44 volts with the capacitors 27 and 28 at a value of 100 micromicrofarads (mmf.) and that switching in response to out-of-phase pulses can be accomplished throughout the range of −34 to −55 volts. Beyond −55 volts the trigger circuit can no longer be operated by a +25 volt input pulse. The out-of-phase pulses are applied to the terminals 31 and 32 as described above. If pulses are to be applied concurrently to the suppressor grid of each trigger circuit the blade of the switch S is moved to contact the left-hand terminal of the switch so that the pulses from the terminal 31 are transferred to the grid 3 of each tube. Obviously, the trigger circuit may also be switched in response to pulses applied concurrently to the terminals 31 and 32 when the switch blade is in contact with the right-hand terminal. It is clear, that the operable range of the trigger circuit is the same irrespective of the manner in which the concurrent pulses are applied to the grids 3 of the tubes A1 and A2.

Similarly, with the values of the capacitors 27 and 28 changed to 200 mmf. the switching of the trigger circuit in response to concurrently applied pulses extends over the bias voltage range of −34.5 to −41.5 volts and in response to out-of-phase pulses over the bias range of −34.5 to −60 volts.

When the values of the capacitors are increased to 300 mmf. and above the trigger circuit will no longer switch in response to concurrently applied pulses. However, switching in response to out-of-phase pulses is effected as indicated in Table I.

The operation of the trigger circuit as shown in Table I is more fully understood by reference to the actual voltage at the electrodes of the trigger tubes A1 and A2 as indicated by oscillograms taken during the actual operation.

Switching of the trigger circuit is accomplished by the application of square wave voltage pulses. Such is indicated by the wave form I$v$ of Fig. 1$a$. These square wave pulses applied to the terminal 31 are differentiated by the capacitor 34 and resistor 35 and when applied to the terminal 32 are differentiated by capacitor 37 and the resistor 38. Hence, the actual pulses applied to the grids 3 of the tubes A1 and A2 are as shown by wave form E$g$3 of Fig. 1$a$. For purposes of explanation, the negative pulses of wave form E$g$3 may be disregarded since they do not effect the conductive condition of the tubes when applied to their third grid.

The oscillogram voltage wave forms shown in Fig. 1$b$ were observed when the capacitors 27 and 28 had a value of 100 mmf. and the bias voltage was −40 volts. Pulses were applied concurrently to the grids 3 of the tubes of the trigger circuit. It is seen from the wave form E$g$2 that the tube is initially conductive since that voltage value is low. At 0 time the positive pulse (wave form E$g$3) applied to the grid 3 of the tube renders the tube momentarily plate current conductive as indicated by the sharp decrease of the voltage E$p$. The voltage at the grid 1 is suddenly decreased as indicated by the wave form E$g$1. This decrease results from the negative voltage applied to it from its plate and the grid 2 of the other trigger tube. The voltage at the grid 2 of the other trigger tube is 180 degrees out of phase with the wave form E$g$2 shown. The same relationship exists between the voltage on the remaining corresponding electrodes of the tubes, for this reason the wave forms for only one tube are shown.

These voltages applied to the grid 1 render the tube non-conductive almost instantaneously. The voltage at the plate E$p$, therefore, rises as does the voltage, E$g$2, at the grid 2 and the voltage at the grid 1 seeks a steady value of −10 volts.

The next positive input pulse (wave form E$g$3) causes the tube to be rendered conductive and the other tube to be rendered non-conductive as previously described. The steep decrease in the voltage wave form E$p$ indicates momentary plate current conductive. This wave form also indicates that the tube reaches a steady conductive condition with slight conduction to the plate.

Referring to Figs. 1$c$ and 1$d$ for the conductive and non-conductive trigger tube respectively, there is demonstrated the trigger circuit performance when a voltage of −50 volts is applied to the line 24. Wave forms for both tubes are shown since the trigger circuit will not switch from concurrently applied pulses. As previously stated the negative pulses applied to the grids 3 of the tubes (wave form E$g$3) have no effect on the stable condition of the trigger circuit, for this reason they will not be referred to in the subsequent explanation.

In Fig. 1$c$ at 0 time the tube is conductive from its cathode to grid 2 and in Fig. 1$d$ the tube is non-conductive. The first positive pulse applied to the grid 3 of the conductive tube causes conduction to the plate and a sharp decrease in its voltage (wave form E$p$). Feedback from this plate to the grid 1 causes a decrease in its voltage (wave form E$g$1) but this decrease is insufficient to place the grid below cut-off. The first positive pulse is applied concurrently to the grid 3 of the non-conductive tube (wave form, E$g$3, Fig. 1$d$) and this tube is rendered momentarily conductive from its cathode to its plate as indicated by the wave forms E$g$1, E$g$2 and E$p$. The decreased voltage at the grid 2 (wave form E$g$2) is conveyed to the grid 1 of the conductive tube but is of insufficient amplitude to place that grid below the cut-off value. Wave form E$g$1 (Fig. 1$c$) indicates that the voltage at the grid 1 is still above the cut-off value despite feedback from its plate and the pulse transferred to it from the grid 2 of the non-conductive tube. Hence, the conducting tube returns to its initial stable condition with conduction between its cathode and second grid.

The sharp negative pulse produced at the plate of the non-conductive tube is fed back to its first grid along with the decreased voltage at grid 2 of the conductive tube present thereat when that tube returns to its initial stable condition.

The next positive pulse applied to the grids 3 causes a similar operation and the trigger circuit remains in its initial stable condition.

It is now clear that at the switching instant the increased voltage transferred to the grid 1 of the non-conductive tube from the grid 2 of the conductive tube is insufficient to overcome the decreased voltage fed back to the grid 1 of the non-conductive tube from its plate and the increased negative bias voltage applied thereto. Also, that the decreased voltage fed back to the grid 1 of the conductive tube from its plate and the decreased voltage transferred to the grid 1 of the conductive tube from the grid 2 of the non-conductive tube are insufficient to place that grid below the cut-off value and thereby render the conductive tube non-conductive. This combination of conditions causes the trigger circuit to resume its initial stable condition.

It should be especially noted that the amplitude of the negative pulse produced at the grid 2 of the non-conductive tube is substantially less than the corresponding negative pulse produced when the voltage on line 24 is −40 volts (wave form $Eg2$, Fig. 1b). It would appear that this single fact is the major reason for the non-switching of the trigger circuit. It appears that the resultant potential excursions of grid 1, particularly of the conducting tube, actually determines whether or not switching will occur.

Referring to Figs. 1e and 1f there are shown the wave forms for the conductive and non-conductive tubes when input pulses are applied simultaneously thereto, the capacitors 27 and 28 each have a value of 500 mmf., and −40 volts is applied to the line 24. It is seen from inspection that these wave forms are generally similar to those of Figs. 1c and 1d. The slight differences in the particular voltage pulses is attributed to the increased values of the capacitors 27 and 28. These wave forms indicate that the increasing of the values of capacitors 27 and 28 is a further method of producing a trigger circuit non-responsive to concurrently applied pulses. The effect of this increased capacitance is to delay the return of the plate voltage of the initially non-conductive tube to its maximum voltage. The feedback of this pulse to the grid 1 of the tube causes the tube to return to its initially non-conductive condition. The grid 1 of the conducting tube of the trigger circuit never reaches cut-off potential and the trigger circuit therefore fails to switch.

Similarly wave forms may be shown to indicate operation of the trigger circuit in response to out-of-phase pulses as shown by Table I.

Figure 2:
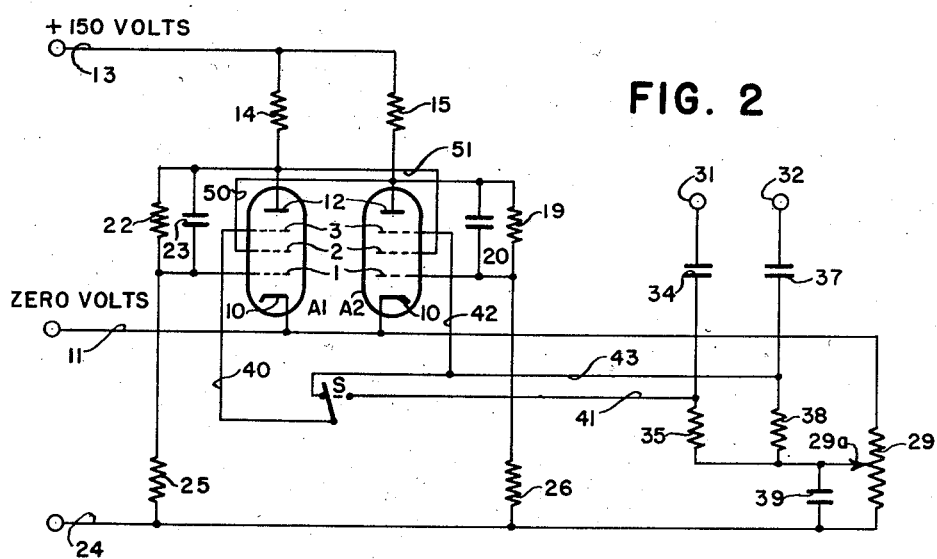
Fig. 2 is a circuit diagram of another embodiment of the invention.

Referring to Fig. 2 the trigger circuit is connected in a manner similar to that of Fig. 1 except for the following designated circuitry. The grid 2 of the tube A1 is connected by lead 50 to the plate of the tube A2 and the grid 2 of the tube A2 is connected by a lead 51 to the plate of the tube A1. The parallel connected resistor 19 and capacitor 20 are connected between the grid 1 and the plate of the tube A2 and parallel connected resistor 22 and capacitor 23 are connected between the grid 1 and the plate of the tube A1. As shown the switch S is in contact with the left-hand terminal thereby adapting the trigger circuit to be switched in response to pulses concurrently applied from terminal 32 to grid 3 of each tube.

It is assumed that the trigger circuit is initially in the "off" condition with conduction occurring between the cathode and grid 2 of the tube A1, the tube A2 being non-conductive. The first pulse applied to the terminal 32 increases the voltage on the grid 3 of the tube A1 sufficiently to cause conduction between the plate and cathode of that tube. The decreased voltage at the plate of tube A1 is applied through the parallel connected capacitor 23 and resistor 22 to the grid 1 of tube A1 to decrease the voltage thereat and thereby reduce the current flow therethrough. This causes an increased voltage at the grid 2 of the tube A1 which causes a decreased voltage drop across resistor 15. This increased voltage at resistor 15 is applied through the parallel connected capacitor 20 and resistor 19 to the grid 1 of the tube A2 and causes current flow between the cathode and grid 2 of tube A2.

This current flow causes an increased voltage drop across the resistor 14. The decreased voltage at resistor 14 is applied through the parallel connected capacitor 23 and resistor 22 to the grid 1 of tube A1. This cumulative action is continued until the trigger circuit is switched to the "on" condition thereby rendering the tube A1 non-conductive and the tube A2 conductive between its cathode and grid 2. In a similar manner the next pulse causes a switching of the trigger circuit to the "off" condition.

Common novel features of Figs. 1 and 2 reside in the manner in which a switching of the trigger circuit is effected. A current flow exists from the cathode to the grid 2 of one tube when the trigger circuit is in either stable condition. This current flow provides for conduction from the plate to the cathode of that tube in response to the next pulse. The novel circuitry then effects current flow from the cathode to the grid 2 of the other tube and non-conduction of the first tube to place the trigger circuit in the other stable condition. Also, the output of the conductive tube is fed back from its plate to its control grid to render that tube less conductive.

Also, each application of input pulses which effect a switching of the trigger circuit causes a gating of the trigger tube conductive between its cathode and the grid 2 so that the electron stream from the cathode to the grid 2 is extended to exist from the cathode to the plate. Functionally, this first mentioned electron stream may be termed a stable electron stream and the second may be termed a work electron stream. Obviously, at the switching instant these streams are merged into a common electron stream.

The novel feature of special practical importance common to Figs. 1 and 2, is the manner in which the concurrent input pulses are applied to effect a switching of the trigger circuit. An electrode of each tube is commonly connected to the source of pulses. Capacitors are not used between these electrodes and the electrodes are not cross-coupled. Hence, the electrodes always have the same voltage applied to them and feedback therebetween is completely eliminated. Each electrode lies in the work electron stream of its associated tube and if the stable electron stream is not present in that tube the input pulse applied to that electrode has no effect whatever on the conductivity of the trigger circuit.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a switching circuit having two tubes respectively comprised of a cathode, first, second and third grids, and a plate and two stable conditions alternately assumed and characterized by stable second grid current in the respective tubes; resistors connected to the respective second grids and plates so as to be disposed in their current paths; means for rendering the different tubes conductive between their cathodes and second grids to provide the stable second grid currents; means for rendering the tubes conductive between their cathodes and plates to provide plate currents; conductive connections for applying pulses to the third grids of each tube to render the one having stable second grid current conductive between its cathode and plate to provide plate current; means including a capacitor connected between the plate and the first grid of each tube to apply a negative-going voltage to the latter to decrease the second grid current when plate current flows in that tube; and means including a capacitor connected between the second grid of each tube and the first grid of the other tube to apply a positive-going voltage to the first grid of the non-conductive tube to initiate stable second grid current flow therein upon a decrease in the second grid current in the conductive tube, said last mentioned means also being effective upon the initiation of stable second grid current flow in the previously non-conductive tube to drive the first grid of the previously conductive tube further in the negative direction to where the latter tube becomes non-conductive, there being no conductive connection between the conductive connections for applying pulses to the third grids of each tube and the cathode, first, second, or third grids, or plate of either of said tubes.

2. A switching circuit as set forth in claim 1, wherein the resistors connected to the respective second grids and plates so as to be disposed in their current paths comprise a separate resistor for each of the second grids and plates.

3. A switching circuit as set forth in claim 1, wherein the resistors connected to the respective second grids and plates are two in number, one being connected to the plate of one tube and the second grid of the other tube while the other is connected to the plate of the other tube and the second grid of the one tube.

References Cited in the file of this patent

UNITED STATES PATENTS

| | | |
|---|---|---|
| 2,369,662 | Deloraine et al. | Feb. 20, 1945 |
| 2,517,986 | Dickinson | Aug. 8, 1950 |
| 2,524,134 | Palmer | Oct. 3, 1950 |
| 2,534,232 | Cleeton | Dec. 19, 1950 |
| 2,695,962 | Nibbe | Nov. 30, 1954 |

OTHER REFERENCES

Paragraphs 5–15 and 5–16 on pages 195 to 200 of Radiation Lab. Series, vol. 19, "Waveforms," published in 1949.